United States Patent [19]
Foster

[11] 4,057,301
[45] Nov. 8, 1977

[54] BRAKE SYSTEM
[75] Inventor: David J. Foster, Rochester, Mich.
[73] Assignee: General Motors Corporation, Detroit, Mich.
[21] Appl. No.: 697,954
[22] Filed: June 21, 1976
[51] Int. Cl.² .............................................. B60T 8/04
[52] U.S. Cl. .................................... 303/114; 60/547; 303/6 R; 303/119
[58] Field of Search ................ 188/357; 303/DIG. 2, 303/6 R, 114, 119; 60/434, 538, 537, 547, 562; 91/367, 453

[56] References Cited
U.S. PATENT DOCUMENTS

| | | | |
|---|---|---|---|
| 3,331,641 | 7/1967 | Wilson | 91/453 X |
| 3,433,536 | 3/1969 | Skinner | 303/114 |
| 3,608,982 | 9/1971 | Inada et al. | 303/6 R X |
| 3,744,853 | 7/1973 | Cullen | 303/114 |
| 3,910,643 | 10/1975 | Kobashi et al. | 303/114 |
| 3,927,915 | 12/1975 | Adachi | 303/114 |
| 3,942,844 | 3/1976 | Inada et al. | 303/114 X |

FOREIGN PATENT DOCUMENTS
1,961,039  6/1971  Germany ...................... 303/DIG. 2

Primary Examiner—George E. A. Halvosa
Attorney, Agent, or Firm—D. D. McGraw

[57] ABSTRACT

A differential pressure brake system for a vehicle with one master cylinder and booster assembly operating the rear wheel brakes and another such assembly operating the front wheel brakes. Each booster is controlled by its own valve, which is in turn controlled by signals from a logic module receiving vehicle deceleration demand signals and wheel deceleration and/or wheel velocity signals. A single brake pedal acts through a force sensor and a whiffletree to provide for mechanical master cylinder operation and reaction. The pressure chambers in the boosters are operated to change the direction of differential pressure generated force from a brake release direction to a brake apply direction when the boosters are operated.

1 Claim, 1 Drawing Figure

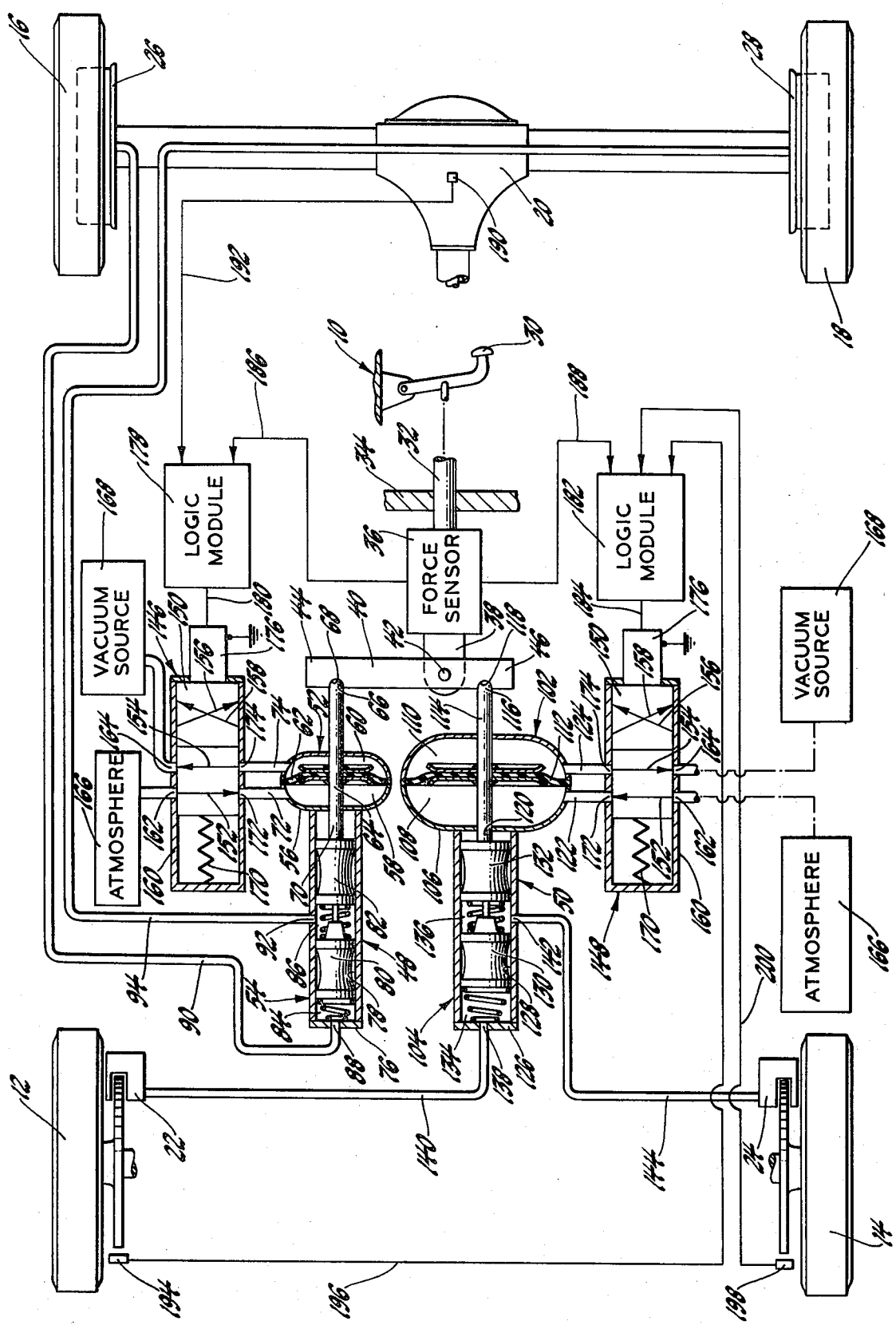

BRAKE SYSTEM

The invention relates to a vehicle brake system with one master cylinder and booster assembly operating the vehicle rear wheel brakes and another master cylinder and booster assembly operating the vehicle front wheel brakes. Each master cylinder has two pressurizing chambers so that each wheel brake of a four-wheel vehicle receives pressure from its own pressurizing chamber. The boosters operate on differential pressure. Each booster normally has the higher pressure on the side of its power wall tending to hold the assembly in a brake release position, and the lower pressure on the other side. A push rod is provided in each booster and extends through the booster from a mechanical lever system operated by a single brake pedal. The boosters are therefore operated in parallel. A pivoting lever of whiffletree arrangement is used for this purpose. A vehicle deceleration or brake force demand sensor is provided in the pedal linkage to the whiffletree and generates a vehicle decleration demand signal responsive to the requirement established by the vehicle operator. Each booster has its own control valve which is operable to increase the booster actuating pressure in the lower pressure side of the booster and decrease the pressure in the higher pressure side, causing a pressure differential reversal as the system is actuated. Each valve is controlled by an electronic logic module responsive to signals from the vehicle deceleration demand sensor. Wheel speed sensors for feedback control purposes are also provided, with one sensor at each front wheel generating signals feeding the electronic logic module controlling the front wheel brake booster. A rear wheel speed sensor, illustrated as being at the drive differential for the rear wheels, generates appropriate signals which are delivered to the electronic logic module for the rear brake booster. In normal brake operation the force sensor acts to control the boosters through their electronic logic modules and valves to apply and release the brakes. When the wheel deceleration exceeds the demanded vehicle deceleration, the corresponding signal from the involved wheel sensor sent to its electronic logic module exceeds the signal corresponding to the vehicle deceleration demand. The electronic logic module then operates the control valve to cause the associated booster to decrease the brake operating force generated by it. The orifices which control the rate of air flow through the control valve are chosen so that the rate of decrease of brake operating force is larger than the rate of increase of brake operating force. This feature provides for wheel lock control should the vehicle operator demand a higher vehicle deceleration than the tire and road surfaces can provide.

Since the system is activated by an electrical deceleration command signal, it is also suitable for use with automatic braking commands. Such commands may be produced by an on-board passive radar controlled system or from external radio commands to vehicles on a guideway, for example.

In The Drawing

The FIGURE is a schematic illustration of a vehicle having a brake system embodying the invention, parts being broken away and in section.

The vehicle 10 is illustrated as being a four-wheel vehicle with independent front wheels 12 and 14, and rear wheels 16 and 18 driven through a differential 20. Front wheels 12 and 14 are respectively provided with front wheel brakes 22 and 24. These brakes are illustrated as being disc brakes. Rear wheels 16 and 18 are respectively provided with rear wheel brakes 26 and 28. These brakes are illustrated as being drum brakes. The vehicle has a brake pedal 30 pivotally mounted for operation by the vehicle operator. A push rod 32 is attached to the brake pedal 30 and extends through a guide 34 so as to be substantially axially movable as the brakes are applied and released. The push rod operates through a brake force demand sensor 36 to move a link 38. An arm or whiffletree 40 is pivotally mounted to link 38 at 42, intermediate the arm ends 44 and 46. For reasons to be described, the linear distance between pivot 42 and arm end 44 is greater than the linear distance between pivot 42 and end 46.

The brake system includes two brake booster and master cylinder assemblies 48 and 50. Assembly 48 has a booster section 52 and a master cylinder section 54. The booster section has a housing 56 divided into chambers 58 and 60 by a power wall 62. A force transmitting member 64 extends through the housing 56 and is secured to the power wall 62 for movement therewith. The end 66 of member 64 is received in a recess 68 formed in the arm end 44. The other member end 70 extends into the master cylinder section 54. A pressure conduit 72 is connected to chamber 58 and a similar pressure conduit 74 is connected to chamber 60.

The master cylinder section 54 includes a master cylinder body 76 having a bore 78 formed therein. Master cylinder pistons 80 and 82 are reciprocably received in bore 78 in the usual manner so that, in cooperation with the bore, they define pressurizing chambers 84 and 86. The master cylinder section is of the usual dual master cylinder type. It has an outlet 88 from pressurizing chamber 84 connected to a brake fluid conduit 90 to provide brake fluid to the rear wheel brake 26. The other master cylinder outlet 92 communicates with pressurizing chamber 86 and is connected with brake fluid conduit 94 to provide brake fluid to rear wheel brake 28. The force transmitting member end 70 abuts piston 82 to transmit master cylinder actuating force therebetween.

Brake booster and master cylinder assembly 50 has a booster section 102 and a master cylinder section 104. The booster section has a housing 106 divided into chambers 108 and 110 by a power wall 112. A force transmitting member 114 extends through the housing 106 and is secured to the power wall 112 for movement therewith. The end 116 of member 114 is received in a recess 118 formed in the arm end 46. The other member end 120 extends into the master cylinder section 104. A pressure conduit 122 is connected to chamber 108 and a similar pressure conduit 124 is connected to chamber 110.

The master cylinder section 104 includes a master cylinder body 126 having a bore 128 formed therein. Master cylinder pistons 130 and 132 are reciprocably received in bore 128 in the usual manner so that, in cooperation with the bore, they define pressurizing chambers 134 and 136. The master cylinder section is of the usual dual master cylinder type. It has an outlet 138 from pressurizing chamber 134 connected to a brake fluid conduit 140 to provide brake fluid to the front wheel brake 22. The other master cylinder outlet 142 communicates with pressurizing chamber 136 and is connected with brake fluid conduit 144 to provide brake fluid to front wheel brake 24. The force transmitting member end 120 abuts piston 132 to transmit master cylinder actuating force therebetween.

The valve mechanism 146 controls booster 52, and a similar valve mechanism 148 controls booster 102. The valve mechanisms are schematically illustrated. Since the valves are identical the parts are described using the same reference characters. Each valve body 150 is provided with diametrically extending passages 152 and 154 in one portion of the valve body, and biased passages 156 and 158 in another part of the valve body. The valve housing 160 has ports 162 and 164 respectively connected to pressure sources 166 and 168. Pressure source 166 is illustrated as being atmospheric pressure, while pressure source 168 is illustrated as being vacuum such as that generated in an engine intake manifold or in an accumulator connected to a vacuum pump. A valve return spring 170 is schematically illustrated as urging the valve body 150 rightwardly in the housing 160 so that passage 152 provides fluid communication between port 162 and an aligned port 172 connected with conduit 72. In this position, passage 154 of valve mechanism 146 provides fluid communication between port 164 and port 174, which is connected to conduit 74. Port 172 of valve mechanism 148 is connected to conduit 122, and port 174 of valve mechanism 148 is connected to conduit 124. A solenoid 176 is connected to move the valve axially against the force of return spring 170. When the solenoid is energized, the valve will move to a second position in which passage 156 connects ports 162 and 174 while passage 158 connects ports 164 and 172. When the solenoid is deenergized, spring 170 will move the valve back to the position shown in the drawing.

An electronic logic module 178 is provided to control solenoid 176 of valve mechanism 146 and is connected to that solenoid by electrical lead 180. A similar electronic module 182 is connected through electrical lead 184 to control solenoid 176 of valve mechanism 148. Electrical lead 186 connects force sensor 36 with module 178 and electrical lead 188 similarly connects force sensor 36 with module 182. The signals generated by the force sensor 36 are transmitted to the modules through leads 186 and 188. A wheel speed sensing device 190 is illustrated as being located at differential 20 so that it senses the average speed of the rear wheels 16 and 18. Sensing device 190 is connected by electrical lead 192 to module 178 so that signals generated by device 190 indicating wheel rotational speed are transmitted to the module. In some installations separate wheel speed sensors for each rear wheel may be used and module 178 can be adapted to receive signals from such devices. The wheel speed sensing device 194 associated with front wheel 12 is connected by electrical lead 196 to the module 182. Wheel speed sensing device 198, associated with front wheel 14, is connected by electrical lead 200 to module 182. Module 182 therefore receives rotational speed information from both front wheels, and contains electronic logic components such that the wheel with the least deceleration is compared with the vehicle demand deceleration to activate valve solenoid 176.

When front disc brakes and rear drum brakes are used, it is desirable to provide for some manner of increasing the brake actuating force of the front brakes relative to the rear brakes. This is also important due to dynamic weight shift during braking. While proportioning devices are known and may be used for this purpose, the particular system illustrated uses a somewhat smaller booster and master cylinder assembly for the rear brakes than for the front brakes. In order to actuate the master cylinder sections on an equal basis, the whiffletree 40 is constructed with a longer lever arm for the rear assembly 48 than for the front assembly 50. This is schematically represented by the differential distance of recesses 68 and 118 relative to pivot 42.

In normal operation with the brakes released and the vehicle running, vacuum is found in booster chambers 60 and 110. Atmospheric pressure is found in booster chambers 58 and 108. The booster power walls 62 and 112 are therefore moved rightwardly to the brake release position and the master cylinder pistons 80, 82, 130 and 132 are in the brake release position. The brake pedal 30 is in its raised position, and the push rod 32, force sensor 36, link 38, and arm 40 are positioned rightwardly as viewed in the drawing. During normal braking operation when no incipient wheel lock occurs, actuation of the brake pedal 30 by the vehicle operator transmits force through push rod 32 to force sensor 36 as well as link 38. Sensor 36 generates vehicle deceleration demand signals in electrical leads 186 and 188. These signals are received by modules 178 and 182, which convert them into valve control signals transmitted to solenoids 176, 176 through electrical leads 180 and 184. Upon the initiation of the requirement for brake force, the solenoids move their respective valve bodies 150, 150 against the forces of springs 170, 170 so that the diagonal passages 156, 156 and 158, 158 cross-connect the pressure sources and the booster chambers. Atmospheric pressure is therefore introduced into booster chambers 60 and 110 and vacuum is imposed in booster chambers 58 and 108. This immediately results in a reversal of the direction of action of the pressure differential on each of the power walls 62 and 112, causing the power walls to move leftwardly. This movement moves the force transmitting members 64 and 114 leftwardly, actuating the master cylinders 54 and 104. Upon master cylinder actuation, brake fluids in the master cylinder pressurizing chambers 84 and 86 are pressurized and transmitted through conduits 90 and 94, respectively, to rear brakes 26 and 28. Brake fluids in pressurizing chambers 134 and 136 are pressurized and respectively transmitted through conduits 140 and 144 to front wheel brakes 22 and 24. The area of booster power wall 112 and the cross-section area of the master cylinder bore 128 of assembly 50 are respectively larger than the similar areas of power walls 62 and bore 78 of assembly 48. This results in a lesser pressure build-up in the rear brakes than in the front brakes and also provides for additional displacement required by the front disc brakes. It can be seen that as the booster sections are actuated in this manner, the arm 40 will follow the force transmitting members 64 and 114, permitting the brake pedal 30 to move downwardly. The force transmitting members will also transmit reaction forces to arm 40 which are combined at pivot 42 and transmitted through link 38, force sensor 36, and push rod 32 to the brake pedal 30. Thus the operator must exert an increased force on the brake pedal 30 as he demands higher vehicle deceleration, and this demand is continually sensed by sensor 36. The sensed wheel speed from sensor 190 and 194 or 198, converted to wheel deceleration and compared with demanded vehicle deceleration by modules 178 and 182, will control the solenoids 176, 176 so that the valve bodies 150, 150 control the differential pressures acting on the booster power walls 62 and 112 in a modulating manner to obtain the desired vehicle deceleration. Upon brake pedal release, the brake demand force sensed by sensor 36 decreases, causing the logic modules to send a brake decrease signal to the solenoids to move the valve bodies to modify the pressures on opposite sides of the booster power walls to decrease the brake actuating forces transmitted to the master cylinder pistons. The brakes can then be returned to the release position.

If the vehicle operator demands a vehicle deceleration which exceeds the deceleration capability of the tire and road surfaces, the system automatically responds to limit the wheel deceleration to the optimum for those surfaces. This is accomplished by making passageways 152, 154 larger in diameter than passageways 156, 158. The rate of decrease of brake apply forces from power boosters 52 and 102 is larger than the rate of increase of such forces. This feature, in conjunction with the known decrease in the available road friction with increase in wheel slip (after maximum road friction has been attained) effectively keeps the power boosters from increasing brake apply pressures to a level which would cause the wheels to lock.

When one of the brake booster sections is being released due to incipient wheel lock, the vehicle operator senses the fact. For example, if brake booster section 52 is so released, force transmitting member 64 will move rightwardly, forcing the end 44 of arm 40 to move rightwardly. If the vehicle operator keeps the brake pedal 30 in the same position, this will cause the arm 40 to pivot about pivot 42 to increase the braking effort for the front brakes by moving arm end 46 leftwardly and forcing member 114 or move leftwardly and also increase the reaction force transmitted to the brake pedal and felt by the operator. If the vehicle operator does not resist the increased brake pedal reaction force, the rightward movement of arm end 44 will cause the arm to pivot about force transmitting member end 116, moving pivot point 42 slightly rightwardly and transmitting this movement back to the brake pedal 30. It can be seen that a similar action will occur if the incipient wheel lock occurred at the front wheels instead of the rear wheels.

While the system has been illustrated as having two complete master cylinder assemblies 48 and 50, it is recognized that a similar force sensor control may be provided for one booster and master cylinder assembly when so desired. For example, this may be useful when no proportioning arrangement is required, when only one master cylinder is used, or when a booster and master cylinder assembly is controlling the wheels of a trailer in a tractor-trailer combination.

The system can be used as illustrated but incorporating only a rear wheel lock control function. If one master cylinder assembly is to be used on a vehicle for actuating brakes on a plurality of axles, it would be necessary to allocate the axle that would provide the feedback signals. Thus, rear wheel lock control could be obtained by using the wheel speed or deceleration signals obtained from the differential in a conventional front engine-rear drive vehicle. It may also be used on front drive vehicles.

What is claimed is:
1. A brake system comprising:
first and second brake booster and master cylinder assemblies each including a brake booster having a power wall adapted to be exposed to differential pressures acting thereacross and in one condition urging the power wall to a brake release position and in another condition urging the power wall to a master cylinder actuating position, and a master cylinder variably actuatable by said power wall in its master cylinder actuating position and connected to actuate a wheel brake for braking a wheel having a wheel speed sensing means associated therewith;
first and second pressure sources operatively connected to said boosters to provide the differential pressures on opposite sides of said power walls;
control means including first and second valve mechanisms for respectively controlling the application of the differential pressures from said sources to opposite sides of the power walls of the first and second boosters, said valve mechanism in one condition selectively applying the higher of said differential pressures to one side and the lower of said differential pressures to the other side of the power walls to urge the power walls to their brake release positions and in another condition selectively applying the higher of said differential pressures to the other side and the lower of said differential pressures to the one side of each of the power walls to urge the power walls toward their master cylinder actuating positions;
and signal generating means for generating signals controlling said control means in accordance with applied brake force, said signal generating means including a sensor generating a wheel deceleration demand signal responsive to manual operating force delivered to said brake booster and master cylinder assemblies, said wheel deceleration demand signal actuating the master cylinders boosted by said brake boosters to the extent differential pressures are selectively applied across said power walls by said valve mechanisms;
said signal generating means further including first and second logic control means respectively for said first and second valve mechanisms, said first and second logic control means receiving signals from said wheel decleration demand sensor and respectively from said wheel speed sensing means of said first and second brake booster and master cylinder assemblies and independently acting upon the receipt of a signal from the associated wheel speed sensing means indicating actual wheel deceleration in excess of the demanded wheel deceleration to independently operate said first and second valve mechanisms to independently apply the differential pressures to opposite sides of a related power wall while in its master cylinder actuating position in a manner to decrease the actuation of the master cylinder by said related power wall.

* * * * *